United States Patent [19]
Bull

[11] Patent Number: 4,792,108
[45] Date of Patent: Dec. 20, 1988

[54] SPACE STATION

[76] Inventor: Stephen M. Bull, 813 Broadway, New York, N.Y. 10003

[21] Appl. No.: 889,003

[22] Filed: Jul. 24, 1986

[51] Int. Cl.[4] .......................... B64G 1/46; B64G 1/64
[52] U.S. Cl. .................................. 244/159; 244/162; 244/158 R; 244/163
[58] Field of Search .................... 244/158 R, 159, 162, 244/160, 163; 296/171

[56] References Cited

U.S. PATENT DOCUMENTS

| | | | |
|---|---|---|---|
| 2,457,581 | 12/1948 | McCain | 296/171 |
| 3,169,725 | 2/1965 | Berglund | 244/159 |
| 3,210,026 | 10/1965 | Frisch | 244/159 |
| 3,300,162 | 1/1967 | Maynard et al. | 244/159 |
| 3,333,788 | 8/1967 | Dryden | 244/158 R |
| 3,749,332 | 7/1973 | Gray | 244/159 |
| 4,562,979 | 1/1986 | Taylor | 244/159 |

OTHER PUBLICATIONS

"Manned Earth Satellites", Interavia, No. 7/1960, pp. 860-862.
MSC-EA-R-66-1, "Preliminary Technical Data for Earth Orbiting Space Station", Nov. 7, 1966, pp. 4.39-4.60.
Woodcock et al., "*Space Stations and Platforms*", Orbit Book Company, Malabar, Fla., 1986, pp. 1-11.
O'Neill et al., "Appendix: Observable Effects in and Human Adapatation to Rotating Environments", A7-8-17192.
Stone, "An Overview of Artifical Grantz", NASA, N74-18757.

*Primary Examiner*—Galen Barefoot
*Attorney, Agent, or Firm*—Davis Hoxie Faithfull & Hapgood

[57] ABSTRACT

This invention relates to space stations and particularly to a novel station composed of structural elements for a complete station adapted in their entirety to be launched in a single voyage as cargo in the hold of a present-day space shuttle, for example, and to be deployed in space and there erected to form a structure presenting a number of modules, held in fixed spaced relation to each other, adapted to enclose a variety of functional areas and as a whole to be rotated to generate centrifugal force in simulation of gravity.

2 Claims, 5 Drawing Sheets

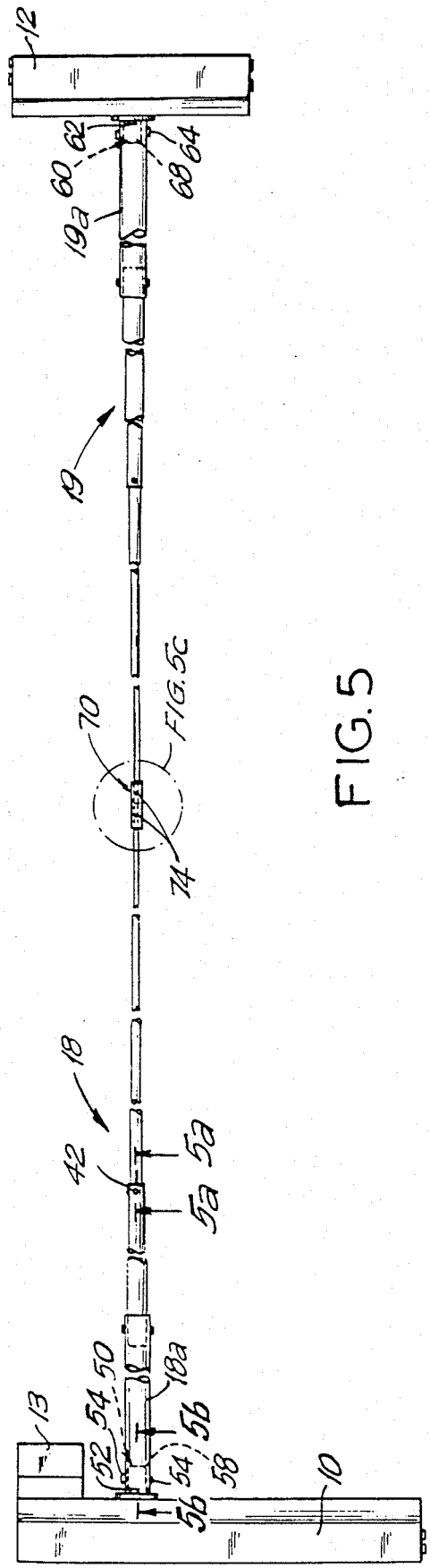
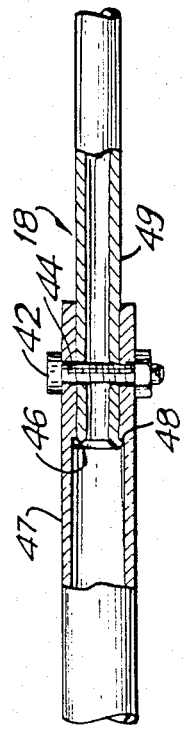
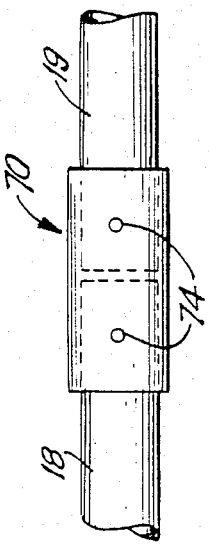
FIG. 5
FIG. 5a
FIG. 5b
FIG. 5c

SPACE STATION

This invention is subject to a royalty-free non-exclusive license to the United States Government as represented by the National Aeronautical an Space Administration.

This application relates to the subject matter of my prior application Ser. No. 607,406 filed May 7, 1984 now abandoned.

This invention relates to space stations and particularly to a novel station composed of structural elements for a complete station adapted in their entirety to be launched in a single voyage as cargo in the hold of a present-day space shuttle, for example, and to be deployed in space and there erected to form a structure presenting a number of modules, held in fixed spaced relation to each other, adapted to enclose a variety of functional areas and as a whole to be rotated to generate centrifugal force in simulation of gravity. The compartments of which the station is composed are of different sizes such that one compartment, the largest, is of a size and shape to fit within the hold, for example, of a space shuttle and in turn to house all of the other compartments during transit into outer space. Before launch, one of the compartments may be outfitted in readiness to serve as space living quarters.

So far as I am aware, the space station of the present invention fills a need that had not been satisfied by prior proposed stations. It does not require successive launches of individual modules to make up a complete space station. Hence, cost is saved and no problem of rendezvous in space is presented. It can be accommodated within the cargo hold of present-day space shuttles. The device is the essence of simplicity and therein, in part, lies its merit. With a crew of no more than two, it can easily and quickly be deployed, assembled and secured to afford living and working quarters. It is visualized that the vehicle, while useful as a permanent station, is also well adapted as a temporary home base during a program of construction of a more elaborate station and indeed can readily be taken apart and returned to earth for possible reserving and relaunch.

In the drawings:

FIG. 5 is a detail of poles 18 and 19 extended and joined to hold a plurality of compartments in spaced relation;

FIG. 5a is a detail section on the line 5a—5a of FIG. 5;

FIG. 5b is a detail section on the line 5b—5b of FIG. 5;

FIG. 5c is an enlarged elevation of the circled area in FIG. 5, and

Figure 4:
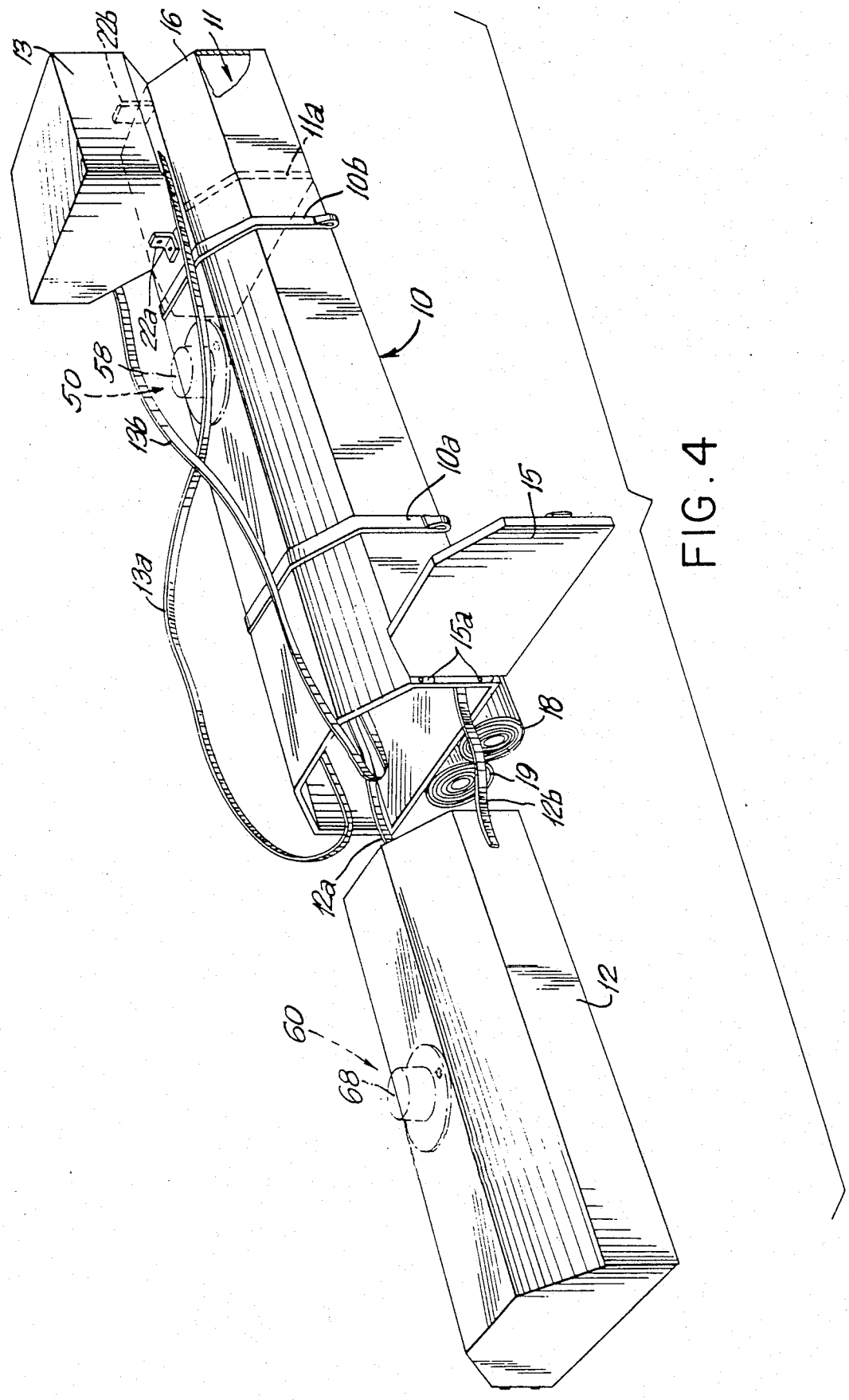
FIG. 4 is an enlarged perspective view of the components of the space station unloaded from the shuttle and partially disassembled and erected ready for completion of the station.

Referring to the drawings, the basic elements of my novel station, as shown in FIG. 4, include a number of compartments of which, for illustrative purposes, four are shown at 10, 11, 12 and 13. Of these, compartment 10 is the largest. Compartment 11 is formed at one end of compartment 10 and is separated therefrom by a bulkhead 11a. Compartment 12 has a cross sectional configuration similar to that of compartment 10, as will be described, slightly smaller than compartment 10. During transit, compartment 12 is contained within compartment 10 abutting partition 11a. Compartment 13, having a cross sectional configuration which may be the same as that of compartment 12, is received within compartment 10 after compartment 12 has been inserted to abut partition 11a. Reference 15 designates a door hinged at 15a, to be closed to secure the compartments in nested position all contained within compartment 10.

Figure 1:
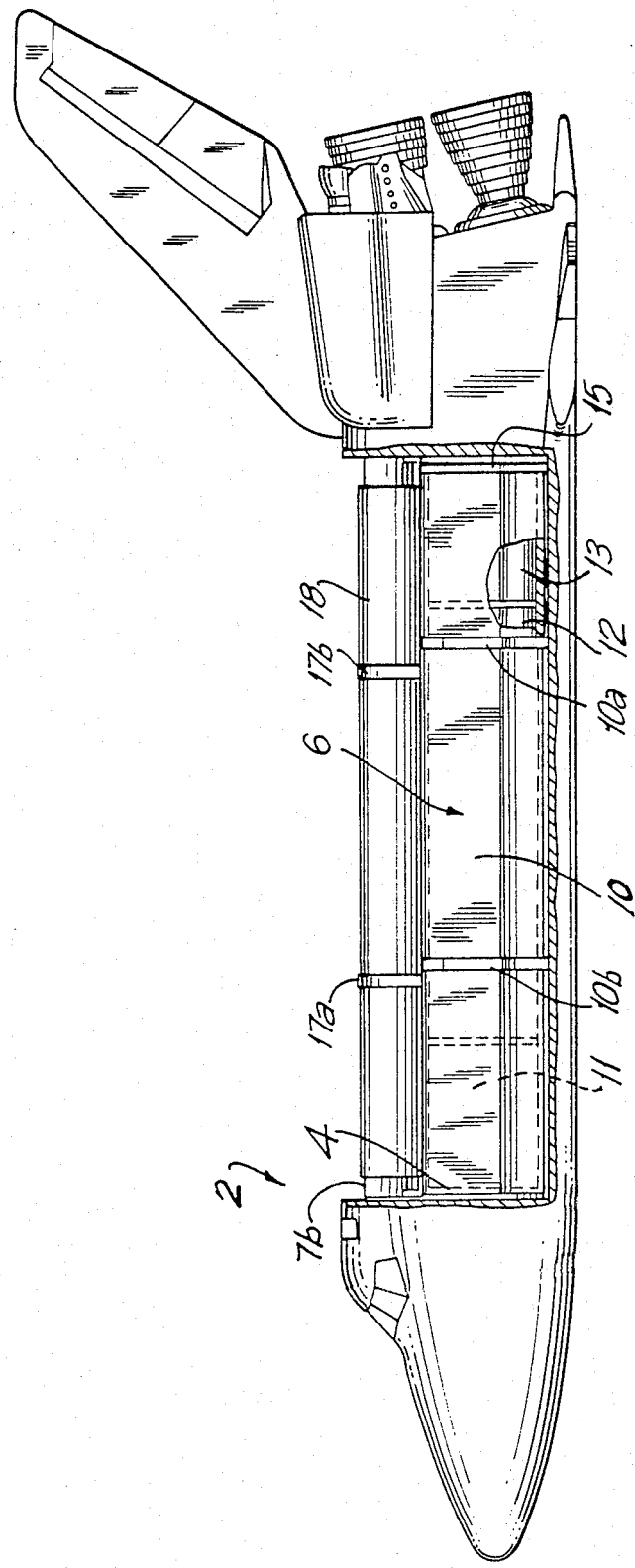
FIG. 1 is a side elevation view showing in outline form a space shuttle broken away to show the components of the space station stowed in their entirety within the hold.
Figure 2:
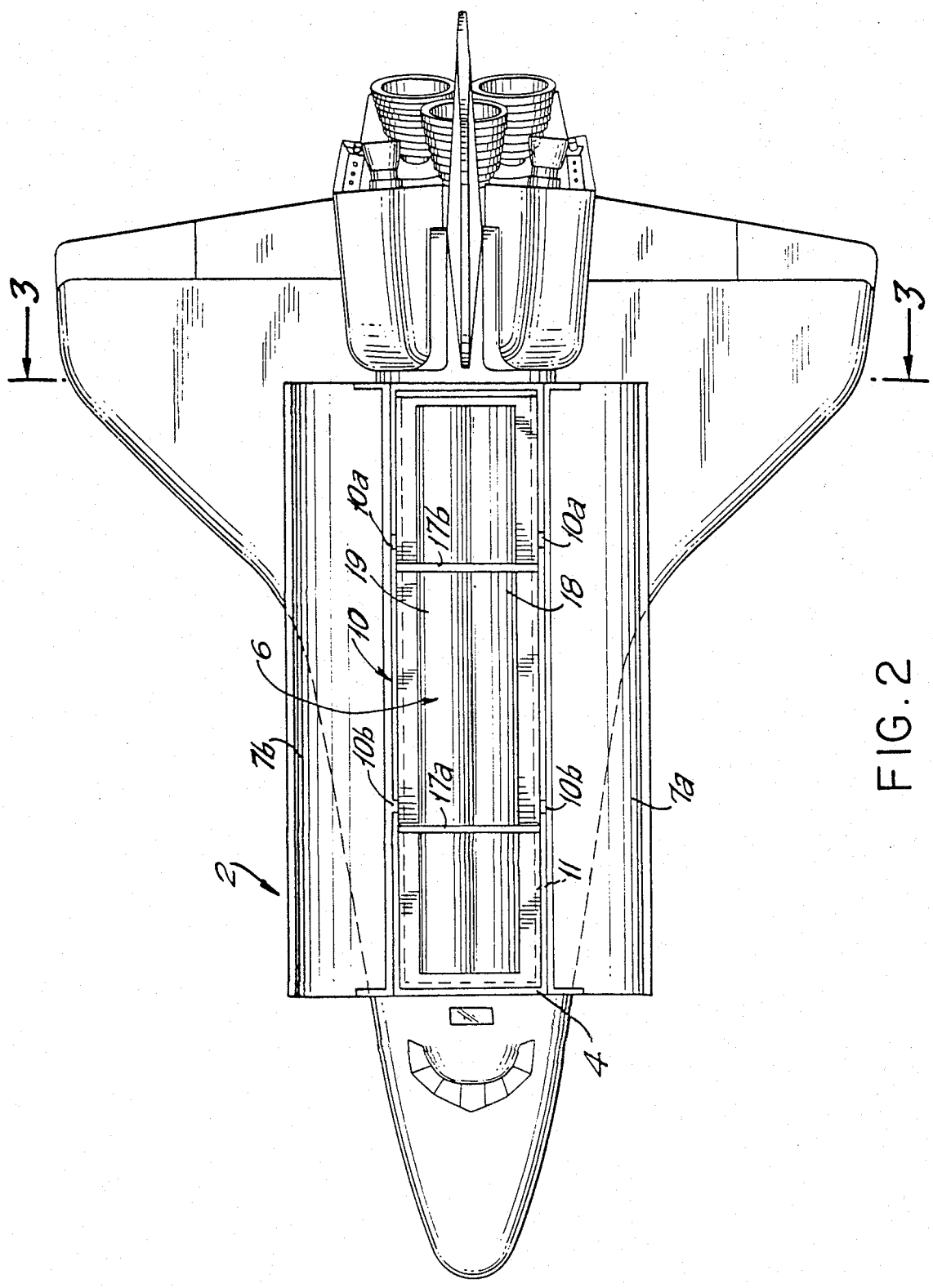
FIG. 2 is a plan view of the space shuttle with top closure panels opened to show the nested and packaged space station components within the hold.
Figure 3:
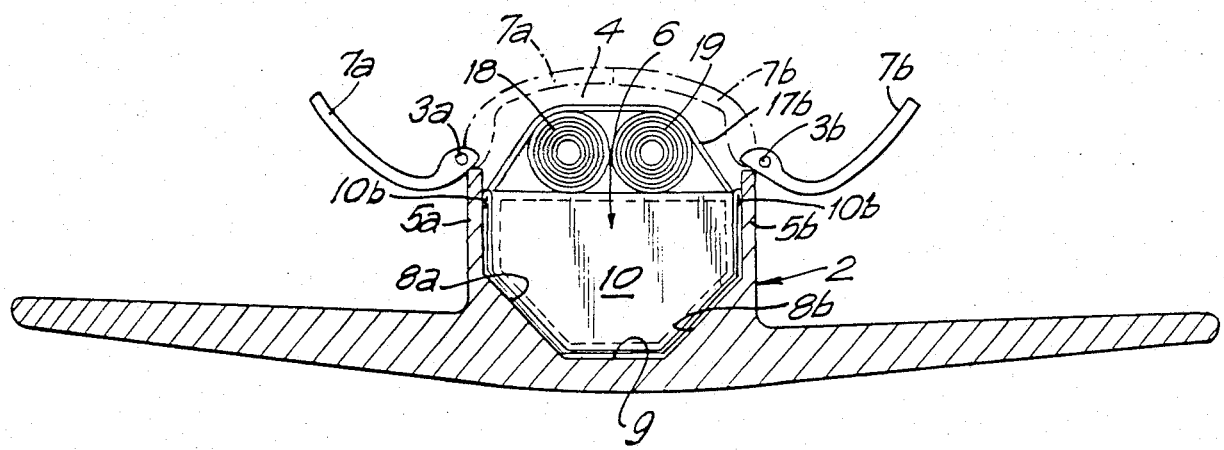
FIG. 3 is a vertical section taken on the line 3—3 of FIG. 2.

Referring to FIGS. 1 to 3, the space shuttle 2 is shown broken away in FIG. 1 to indicate the hold 4 containing the stowed components of the space station indicated generally at 6. Two telescoping poles 18 and 19 are strapped securely at 17a and 17b to the top of the main compartment 10, which is shown serving to house all other compartments 11, 12 and 13.

Referring to FIGS. 2 and 3, pivoted at 3a and 3b to the upper margins of the side walls 5a and 5b are doors 7a and 7b, respectively, arcuate in configuration to conform when closed to the arcuate shape of the shuttle body and adapted to be swung about the pivots 3a and 3b from their dotted line closed positions to their full line open positions for unloading the space station components 6 within the hold.

The space shuttle hold 4 is desirably shaped internally with side walls which, at their lower portions 8a and 8b, converge to join the bottom 9 of the hold. The side and bottom walls, as viewed in FIG. 3, of compartment 10 are shaped and of a size to be received within the hold, conformingly to the side and bottom walls of the hold. Compartments 11, 12 and 13 are shaped similarly.

In space, no more than two crew members are needed to construct the station. Doors 7a and 7b on the space shuttle are opened. The two crew members pull upwardly on two nylon straps 10a and 10b slung around compartment 10 and between it and the space shuttle hold. As a result, space station 6 slides gently out of the hold 4 and is free of the space shuttle 2. It is then inverted (FIG. 4) so that, e.g., the surface of compartment 10 to which poles 18 and 19 are strapped is now lowermost.

FIG. 4 shows how assembly of the space station is initiated. First, the crew opens door 15 which is pivoted at 15a to the side wall of compartment 10. They then remove compartment 13 nested within. The crew would pull the nylon straps 13a and 13b attached between compartment 10 and compartment 13. These nylon straps facilitate the removal of compartment 13 from the interior of compartment 10 and tether the two compartments together until 13 can be securely fastened to the outside of compartment 10. Removal of compartment 13 from within compartment 10 may be eased by roller bearings not shown.

After compartment 13 has been removed and while still tethered to 10 by the nylon straps 13a, 13b, the crew guides compartment 13 to a position on the now upper side of compartment 10, as shown in FIG. 4, directly superimposed over the interior bulkheaded compartment 11. It is contemplated that compartment 13 will house the life support system needed for the space station; that is, the necessary power supplies, atmosphere recycling equipment, communications, computers, etc. Compartment 13 is suitably attached over space 11 as suggested by right angle bracket 22a on one end and a flat bracket 22b on the other end. The life support system within 13 is then interconnected between compartment 13 and the compartment 11. The bulkheaded interior space forming compartment 11 serves as the crew's quarters and may contain, e.g., communications equipment, emergency life support systems, space suits, sleeping couches, etc. The compartment space 11 is accessible from an airlock door (not shown) located on the end wall 16 and by an airlock door (not shown) through bulkhead 11a. The interior bulkheaded space 11 may be equipped with additional backup safety devices for emergency purposes. The first task to be undertaken after initial deployment of the undissembled space station into space by the shuttle, or otherwise, is the positioning of compartment 13 against compartment 11 as shown in FIG. 4 and to interconnect the life support systems aboard compartment 13 with the crew's quarters in compartment 11. After the satisfactory interconnection of the life support and communication equipment between compartments 13 and 11 and the assurance of safety in the crew's quarters, the crew continues to construct the rest of the space station.

FIG. 5 is a side view in reduced scale partly broken away of the space station as it will appear when completely assembled. Compartments 10 and 13, secured together, will be secured to compartment 12 in predetermined spaced relation thereto by means of the two telescoping poles 18 and 19 previously stored on the outside of compartment 10 and which, after removal, are fully extended and connected in alignment with each other. Each of the two telescoping poles 18 and 19 is designed to extend, e.g., some 7 times its stored length, and when the two poles are attached end to end in alignment as indicated in FIG. 5, the extended poles 18 and 19 may separate compartment 10 from compartment 12, e.g., approximately 1,000 feet. Poles 18 and 19 may be identical and interchangeable in construction, and they are designed to be strong and flexible to withstand the various forces attributable to the presence of compartments 12 and 10 secured opposite each other to poles 18 and 19 aligned in extended position. The telescoping poles 18 and 19 may be made of lightweight nested carbon fiber tubes.

After the crew's quarters have been made safe, and before compartment 12 is removed from compartment 10, the next step in the space station assembly is to attach footing bracket 50 to the exterior of compartment 10 as shown in dot-dash lines in FIG. 4. As shown in FIG. 5b, bolts 52 through the base of bracket 50 tap into compartment 10 to fasten the bracket to the compartment. The bracket 50 has a protruding post 58 adapted to be received within a conforming sleeve 18a in the base end of pole 18 which may be slipped over the post 58. The crew maneuvers telescoped pole 18 onto the post 58 of bracket 50 before the pole has been extended. The telescoped pole would then appear extending perpendicularly from the top surface of compartment 10. A bolt 54 through sleeve 88a and through post 58 secures the pole 18 to the bracket 50. Next, the crew extends the nested sections of pole 18. The friction between the sections may be minimized by the application of an appropriate lubricant, e.g., graphite or Teflon, to their sliding surfaces. As shown in FIG. 5a, each tube is provided, as appropriate, with a shoulder 46 at the head end 47 and a flange 48 at the tail end 49. When an inner tube is thrust out from within the adjacent larger outer tube, the flange 48 at the tail end 49 of the inner tube abuts the shoulder 46 adjacent the head end 47 of the larger tube to prevent the smaller tube from exiting the larger tube. A bolt 42 inserted through aligned holes 44 through the outer and inner tube holds the adjoining tubes in rigid fixed extended position. Next, the crew extends the telescoped pole 19, after which the extended tip end of pole 19 is disposed opposite and in alignment with the extended tip end of pole 18. Poles 18 and 1 are now joined by collar 70 over the extended tip ends of poles 18 and 19, and secured by bolts 74 as shown in FIG. 5c.

It is preferably not until after the poles 18 and 19 have been extended and interconnected that the crew removes the compartment 12 from the interior of compartment 10 as above described. The nylon straps 12a and 12b tether compartment 12 to compartment 10 while the crew attaches footing bracket 60 to the exterior of container 12 (see FIG. 4) and secures it thereto by bolts 62, in the same fashion as bracket 50 was attached to container 10. While compartment 12 is still tethered to compartment 10 it is maneuvered away from compartment 10 until protruding post 68 of bracket 60 is aligned with extended pole 19 and may be inserted into sleeve end 19a. Pole 19 fastens to post 68 by a bolt 64. Tether straps 12a and 12b may then be removed. After compartments 12 and 13 have so been removed from compartment 10, the door 15 is closed and resealed, enclosing the interior space of compartment 10 as an airtight space suitable for atmospheric pressurizing. The crew has the flexibility of transforming the interior space of compartment 10 as their needs dictate. After compartment 10 has so been unloaded, it becomes the principal living, working and/or storage unit of the space station.

Figure 6:
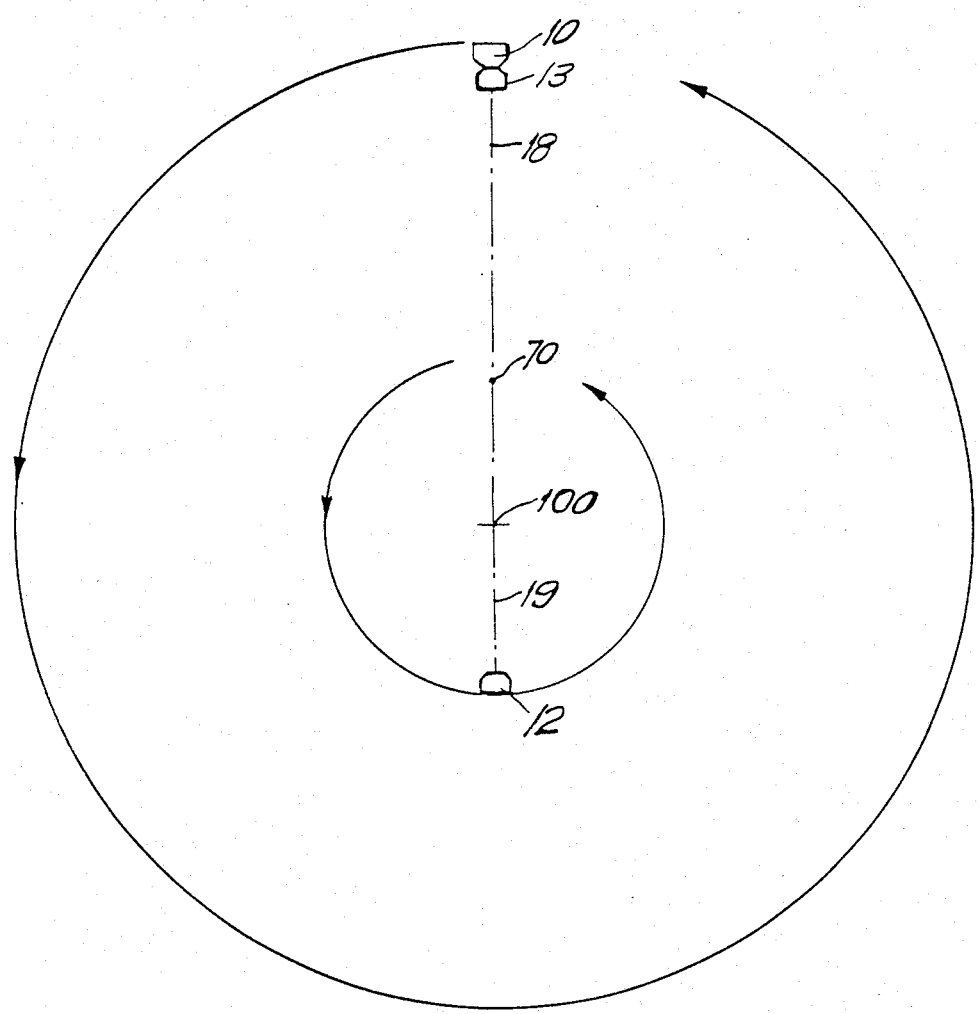
FIG. 6 is a diagrammatic view to indicate the space station rotating about an axis to provide centrifugal force within the compartments in simulation of gravity.

FIG. 6 is a diagrammatic view in reduced scale of the completely constructed space station in operational mode rotating about its center of mass axis 100 providing simulated gravity to the compartments 10, 13 and 12, it being understood, of course, that the center of rotation of the space station will shift depending on the masses held within or attached to compartments 10, 12 and 13. This completes the mechanical transformation of the stored structural elements, aboard a space shuttle, into the finished space station. In this embodiment, compartment 12 may carry a cargo of consumable supplies for the crew, experiment apparatus, manufacturing equipment and manufacturing raw materials. When the space station is rotating to achieve simulated gravity, compartment 12 serves as a counterbalance to compartments 10 and 13. Enough cargo mass will remain behind in compartment 12 for it to function as a counterweight. Raw materials stored as cargo aboard 12 would be exchanged mass for mass with the finished manufactured items exiting compartment 10. When all the finished goods are transferred to compartment 12, compartment 12 could serve as the storage container for the goods to be returned to earth, when another compartment 12 filled with raw materials is exchanged for it in space. In other embodiments, compartment 12 could house a heavy duty electrical power generation plant for conversion into radio frequency energy, turning the space station into an enormous broadcasting satellite.

Alternatively the cargo nested inside compartment 12 could as easily be mounted on a pallet and in space stored on the outside of compartment 12, so that compartment 12 continues to function as a counterweight, but the interior space, now empty, can be pressurized and function as additional work or living area.

This space station is simple in construction, requires no exterior assistance in erection and is habitable during all phases of construction. However, it may be noted that there may be a different extended connecting means employed and/or there may be more than two nested components held at a distance in relation to each other. Also, a station may comprise a different number of components than shown in the illustrated embodiment within the spirit of the invention. Indeed the space station as described may be duplicated on succeeding shuttle voyages and linked together with interconnecting and communicating compartments.

Although the invention has been described relative to the specific embodiments thereof, it is not so limited and many modifications and variations will become apparent without departing from the spirit and the scope of the invention. Though not gone into in any detail, it is assumed that the capacities of the individual space vehicle compartments would vary in accordance with the diverse needs for the sustenance of human life in orbit around the earth or in use elsewhere in outer space. It is also assumed that, if desired, expendable supplies such as foodstuffs, respiration, energy and thrusting chemicals will be supplied to the operational station at regular intervals through docking provided for such transfers. It is therefore understood that within the scope of the appended claims, the invention may be practiced otherwise than as specifically described herein. This depicture of the invention has been descriptive rather than limiting; it is understood that any modifications, substitutions or combinations thereof that are within the scope of the claims have not been mentioned for the sake of brevity.

What is claimed as new and desired to be secured by Letters Patent of tee United States is:

1. As structure for a space station, the combination comprising
    a pair of compartments, one larger than the other and in which the other is nested for transport aloft in a space shuttle or the like, the compartments being tethered together while so nested and when later separated to facilitate manipulation relative to each other when in space,
    and means for mounting the two compartments in spaced relation to each other aloft, comprising telescoping pole means detached from the compartments and contracted during transport aloft, the said telescoping pole means being of a contracted length not substantially greater than that of the larger compartment, the said telescoping pole means being expanded when aloft and attached at opposite ends to the two compartments, the telescoping pole means being of an expanded length, between opposite ends, of a substantial multiple of the contracted length to provide one of said compartments with a desired artificial gravitational force when the station is rotated at a moderate rotational velocity about an axis intermediate said compartments.

2. The structure of claim 1 in which the expanded length of the telescoping pole means affords a radius of rotation to create an artificial gravitational force in said one compartment of the order of 1G at a rotational velocity of the order of 2, plus or minus a fraction, revolutions per minute.

* * * * *

UNITED STATES PATENT AND TRADEMARK OFFICE
CERTIFICATE OF CORRECTION

PATENT NO. : 4,792,108
DATED      : December 20, 1988
INVENTOR(S) : Stephen M. Bull It is certified that error appears in the above-identified patent and that said Letters Patent is hereby corrected as shown below:

Col. 1, line 6, change "National Aeronautical an Space Administration" to -- National Aeronautical and Space Administration -- .

Col. 1, line 44, change "reserving" to -- reservicing -- .

Col. 3, line 65, change "88a" to -- 18a -- .

Col. 4, line 15, change "1" to -- 19 -- .

Col. 6, line 5, change "tee" to -- the -- .

Signed and Sealed this

Sixth Day of June, 1989

*Attest:*

DONALD J. QUIGG

*Attesting Officer*

*Commissioner of Patents and Trademarks*